US008296038B2

(12) United States Patent
Verdejo et al.

(10) Patent No.: US 8,296,038 B2
(45) Date of Patent: Oct. 23, 2012

(54) METHOD AND SYSTEM FOR DETERMINING ENGINE BRAKE TORQUE IN REAL TIME

(75) Inventors: Julian R. Verdejo, Farmington, MI (US); Paul A. Piorkowski, Belleville, MI (US); Qi Ma, Farmington Hills, MI (US)

(73) Assignee: GM Global Technology Operations LLC

( * ) Notice: Subject to any disclaimer, the term of this patent is extended or adjusted under 35 U.S.C. 154(b) by 870 days.

(21) Appl. No.: 12/396,811

(22) Filed: Mar. 3, 2009

(65) Prior Publication Data

US 2010/0228462 A1 Sep. 9, 2010

(51) Int. Cl.
*G06F 19/00* (2006.01)
*B60W 10/04* (2006.01)

(52) U.S. Cl. ........................................................ 701/102

(58) Field of Classification Search .................. 701/102, 701/51, 53, 67, 115; 477/181, 156, 70, 86
See application file for complete search history.

(56) References Cited

U.S. PATENT DOCUMENTS

| | | | | |
|---|---|---|---|---|
| 3,752,012 | A * | 8/1973 | Ross et al. | 477/156 |
| 4,067,243 | A * | 1/1978 | Kurata et al. | 74/6 |
| 4,505,369 | A * | 3/1985 | Muller et al. | 192/98 |
| 4,813,295 | A * | 3/1989 | Drexl et al. | 464/68.41 |
| 5,485,757 | A * | 1/1996 | Foxwell | 73/862.321 |
| 6,260,642 | B1 * | 7/2001 | Yamamoto et al. | 180/6.7 |
| 7,044,281 | B2 * | 5/2006 | Kosugi et al. | 192/52.1 |
| 7,584,039 | B2 * | 9/2009 | Dobele et al. | 701/53 |
| 2003/0029406 | A1 * | 2/2003 | Weiss | 123/179.4 |
| 2011/0166760 | A1 * | 7/2011 | Kiessner-Haiden | 701/68 |

* cited by examiner

*Primary Examiner* — Hieu T Vo

(57) ABSTRACT

A method and system for controlling an engine function includes a deflection determination module generating a clutch deflection signal. The system further includes an engine function module controlling an engine function in response to the clutch deflection signal. The clutch deflection signal may be generated by sensors associated with the transmission shaft such as within the clutch housing or the friction disk.

18 Claims, 5 Drawing Sheets

METHOD AND SYSTEM FOR DETERMINING ENGINE BRAKE TORQUE IN REAL TIME

FIELD

The present disclosure relates generally to engine controls and, more particularly, to a method and apparatus for determining engine brake torque.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine brake torque is determined in various manners. Typically, an estimate of engine brake torque is created by collecting a large matrix of steady state engine operating points and regressing the measured engine brake torque against available engine operating variables, such as engine speed, mass airflow, spark and the like. Typically, the engine brake torque estimate is good to within plus or minus 15 Newton meters or about 10 percent. A more accurate determination of torque may allow a more precise control of the engine. More precise control of the engine may lead to increased power and increased fuel economy.

SUMMARY

The present disclosure determines a torsional deflection of a friction clutch disk to provide a measurement of engine brake torque. This may be performed in real time to provide an accurate determination of engine torque that may later be used by the engine controller for controlling various engine functions.

In one aspect of the disclosure, a method includes generating a clutch deflection signal and controlling an engine function in response to the clutch deflection signal.

In a further aspect of the disclosure, a control module for controlling an engine function includes a deflection determination module generating a clutch deflection signal. The system further includes an engine function module controlling an engine function in response to the clutch deflection signal. The clutch deflection signal may be generated by sensors associated with the transmission shaft such as within the clutch housing or the friction disk.

In yet another aspect of the disclosure, a method includes generating a clutch spring force signal and controlling an engine function in response to the clutch spring force signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
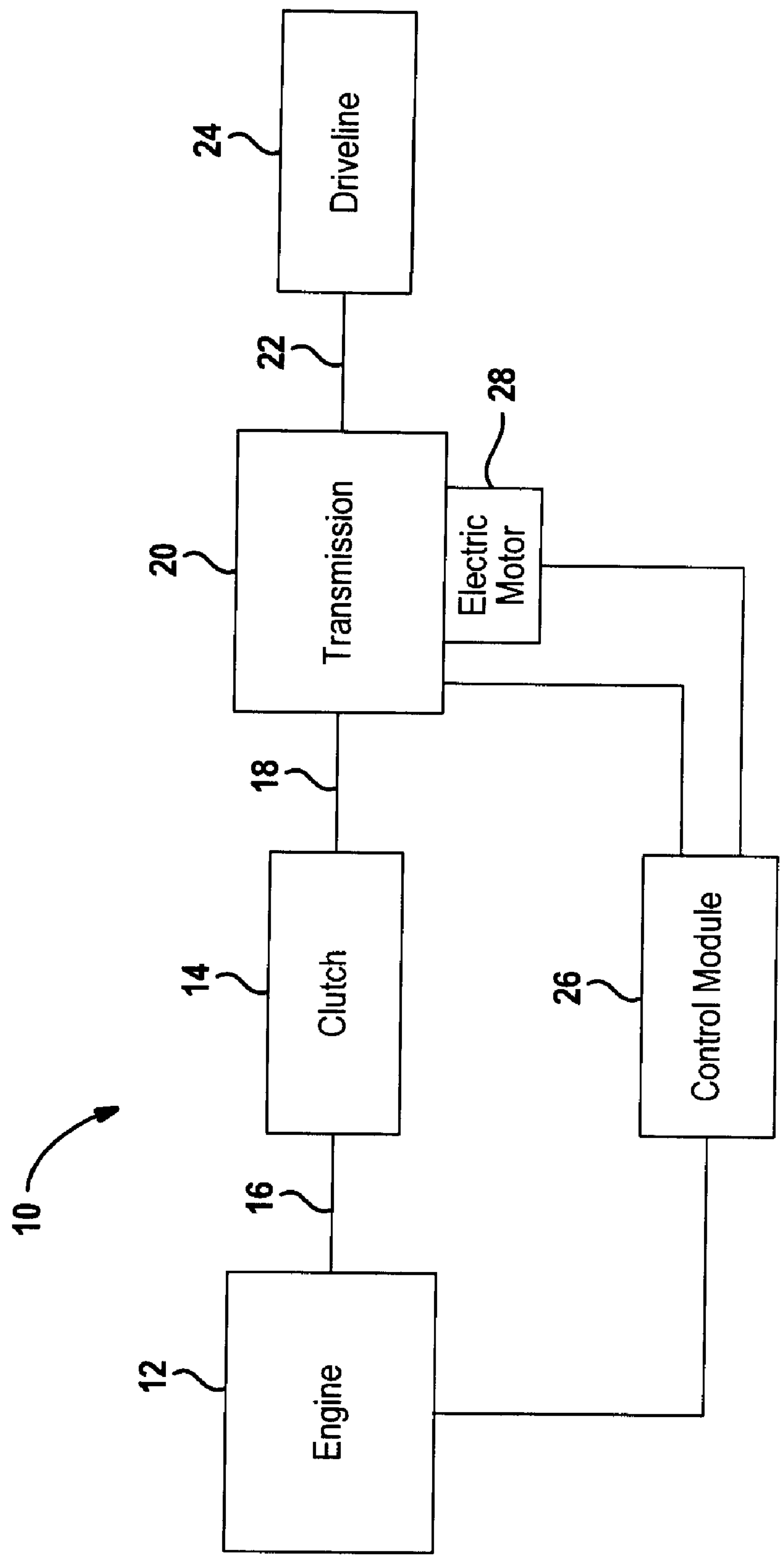
FIG. 1 is a block diagrammatic view of a vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 is illustrated having an engine 12 that is coupled to a clutch 14 through a crankshaft 16. The clutch 14 has an output shaft that is in communication with an input shaft 18 of a transmission 20. The transmission 20 has an output shaft 22 that is in communication with a driveline 24. A control module 26 may control the functions of the engine and a transmission 20. An electric motor 28 disposed in or around the transmission 20 may provide the vehicle 10 with hybrid vehicle functions.

The engine 12 may be various types of engines, including a diesel engine, a direct-injection engine, or the like.

The clutch 14 and transmission 20 are illustrated as separate components. The transmission 20 may be a manual transmission having a manually operated clutch with a clutch pedal and stick shift. The transmission 20 may also be automatic transmission and therefore clutch 14 may actually be incorporated within a transmission housing. A typical automatic transmission has several clutches to actuate various gears.

The driveline 24 may include a drive shaft, a differential and various other components.

The control module 26 may comprise one module or several modules combined together. The control module 26 may include the functions of an engine control module and a transmission control module if the transmission is an automatic transmission. As will be described below, the control module 26 may receive various signals for controlling the engine and the transmission. In particular, the present disclosure is directed to determining the engine brake torque which is the torque provided by the engine at the crankshaft 16. As will be described below, the engine brake torque may be determined using the torsional deflection of the friction disk of the clutch 14.

Figure 2:
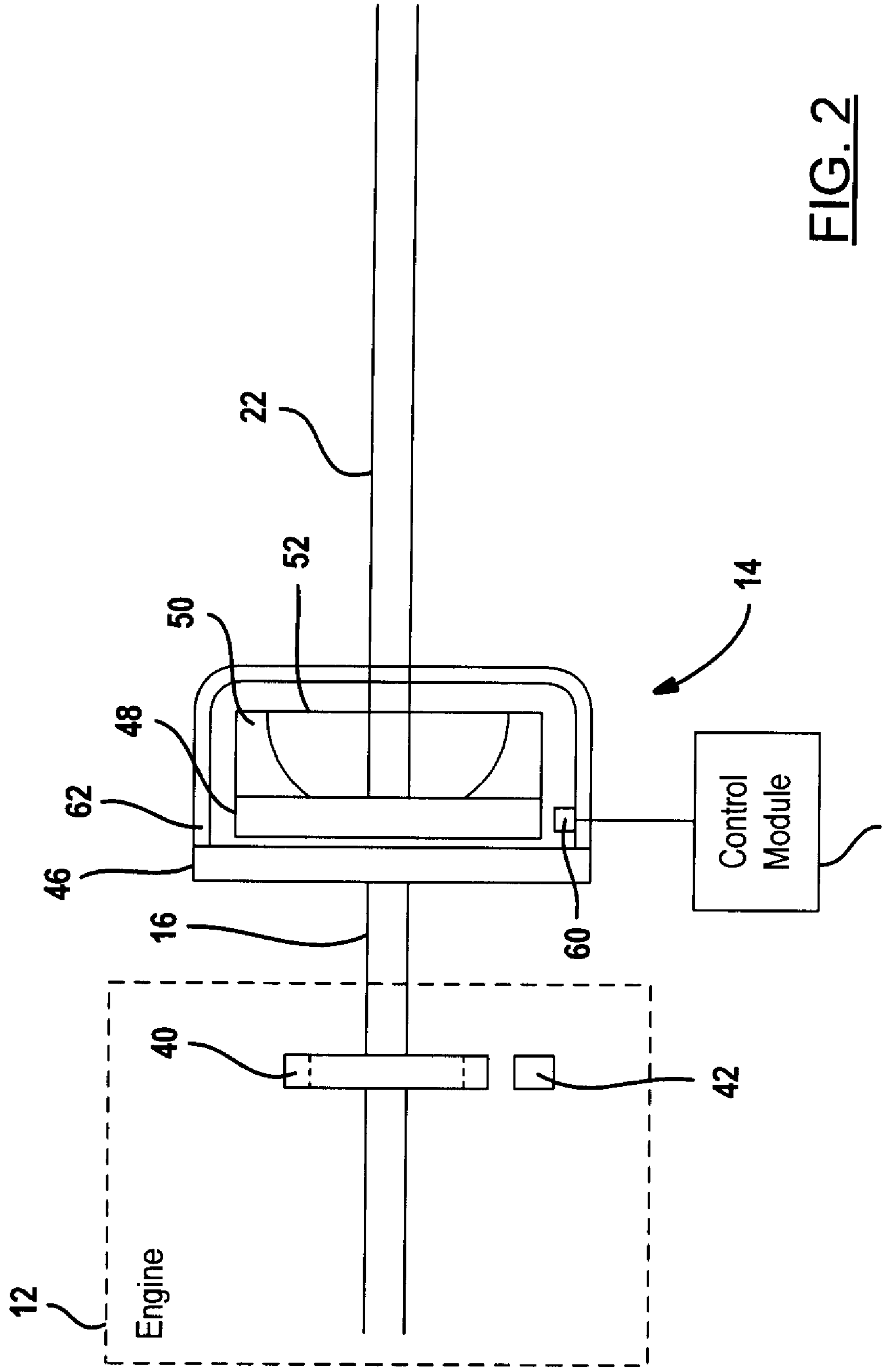
FIG. 2 is a diagrammatic representation of an engine and clutch according to the present disclosure.

Referring now to FIG. 2, the clutch 14 is illustrated in further detail adjacent to the engine 12. The engine 12, as mentioned above, has a crankshaft 16. A disk 40 may be fixedly coupled to the shaft 16. A position sensor 42 positioned adjacent to the disk 40 may provide a position signal corresponding to the position of the crankshaft. The sensor 42 may be a hall-effect sensor. Often times, a crankshaft position sensor is provided within the vehicle for other vehicle functions. The target wheel or disk 40 on the crankshaft 16 may be provided at either end of the engine and extending from the engine block. A housing may be covering the target wheel or disk and the sensor 42.

The clutch 14 illustrated in FIG. 2 is a simplified version of a manual clutch. However, as mentioned above, an automatic clutch may also be used. The clutch 14 is used for disengaging the engine 12 from the transmission 20.

The crankshaft 16 has a flywheel 46 coupled thereto. The transmission input shaft 22 has a clutch disk or clutch plate 48 coupled thereto. A pressure plate 50 is in communication with a diaphragm spring 52. When the clutch pedal is depressed, a cable or hydraulic piston pushes a piston or the like which is now shown which in turn pushes the diaphragm spring 52 toward the engine 12 and thus pushes the pressure place 50 to move the clutch disk 48 against the flywheel 46.

A clutch disk position sensor 60 may be positioned on the clutch housing 62. The clutch disk position sensor 60 may generate a clutch disk position signal corresponding to the deflection of the friction or clutch disk 48. The sensor 60 may be one of a number of different types of sensors, including a hall-effect sensor. The hall-effect sensor 60 may generate a signal from magnets, teeth, or the like positioned on the clutch disk 48.

Figure 3:
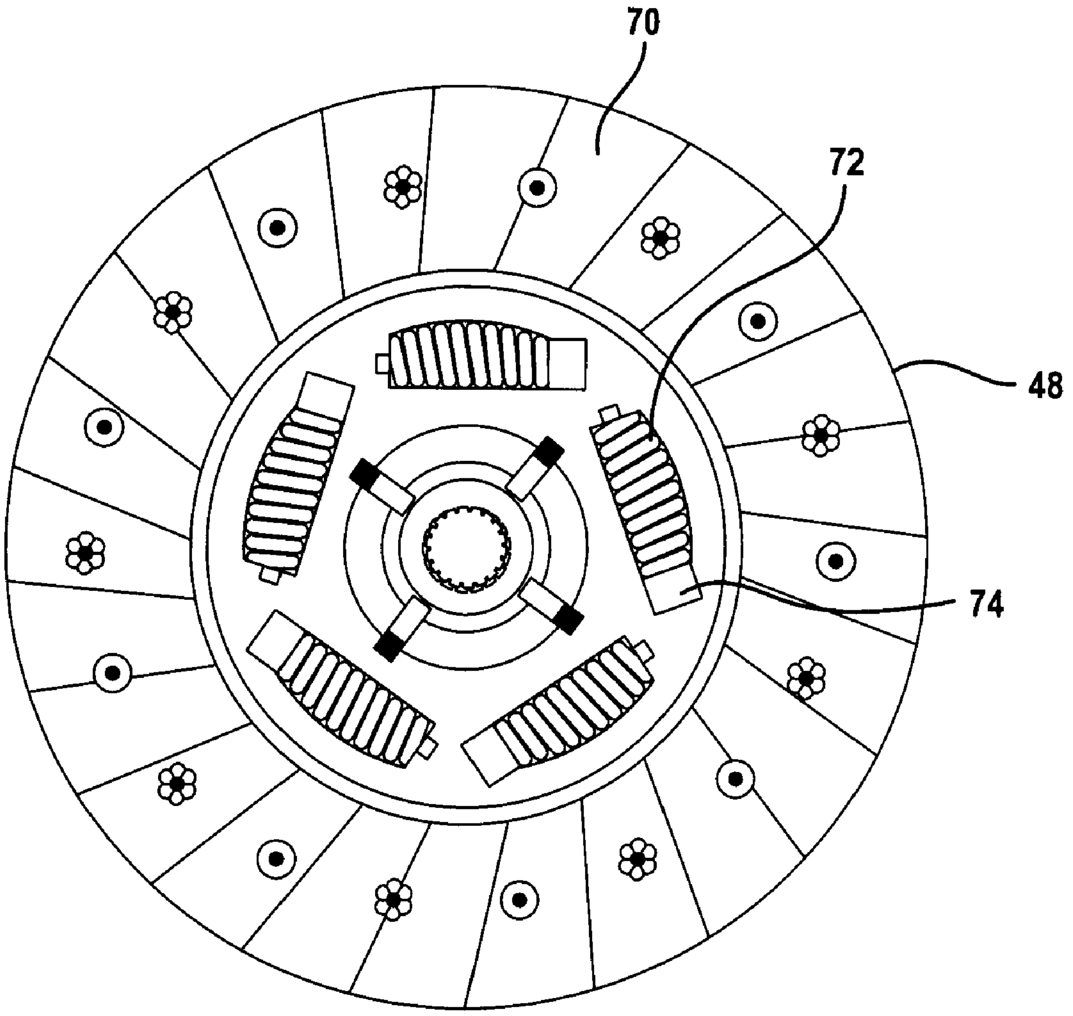
FIG. 3 is a front view of a clutch plate having a sensor according to the present disclosure.

Referring now to FIG. 3, a front or elevational view of the clutch disk 48 is illustrated. The clutch disk 48 includes friction material 70 disposed circumferentially there around for frictionally engaging the flywheel 46 when the clutch is actuated. The clutch 48 also includes springs 72. The springs 72 isolate the transmission from the shock of the clutch engaging. Also, the springs 72 are designed to absorb the individual torque pulses of the firing of the individual cylinders.

A spring sensor 74 may be disposed to generate a spring-force signal or a spring deflection signal. The sensor 74 may be coupled directly to the spring and measure the force of force acting on the spring or a deflection of the spring. The spring deflection or the spring force sensed by the spring sensor 74 corresponds to the torsional deflection of the clutch and disk. The spring sensor 74 may be used instead of the sensor 60 illustrated in FIG. 2. However, the spring sensor 74 could also be used in addition to the sensor 60 illustrated in FIG. 2.

Figure 4:
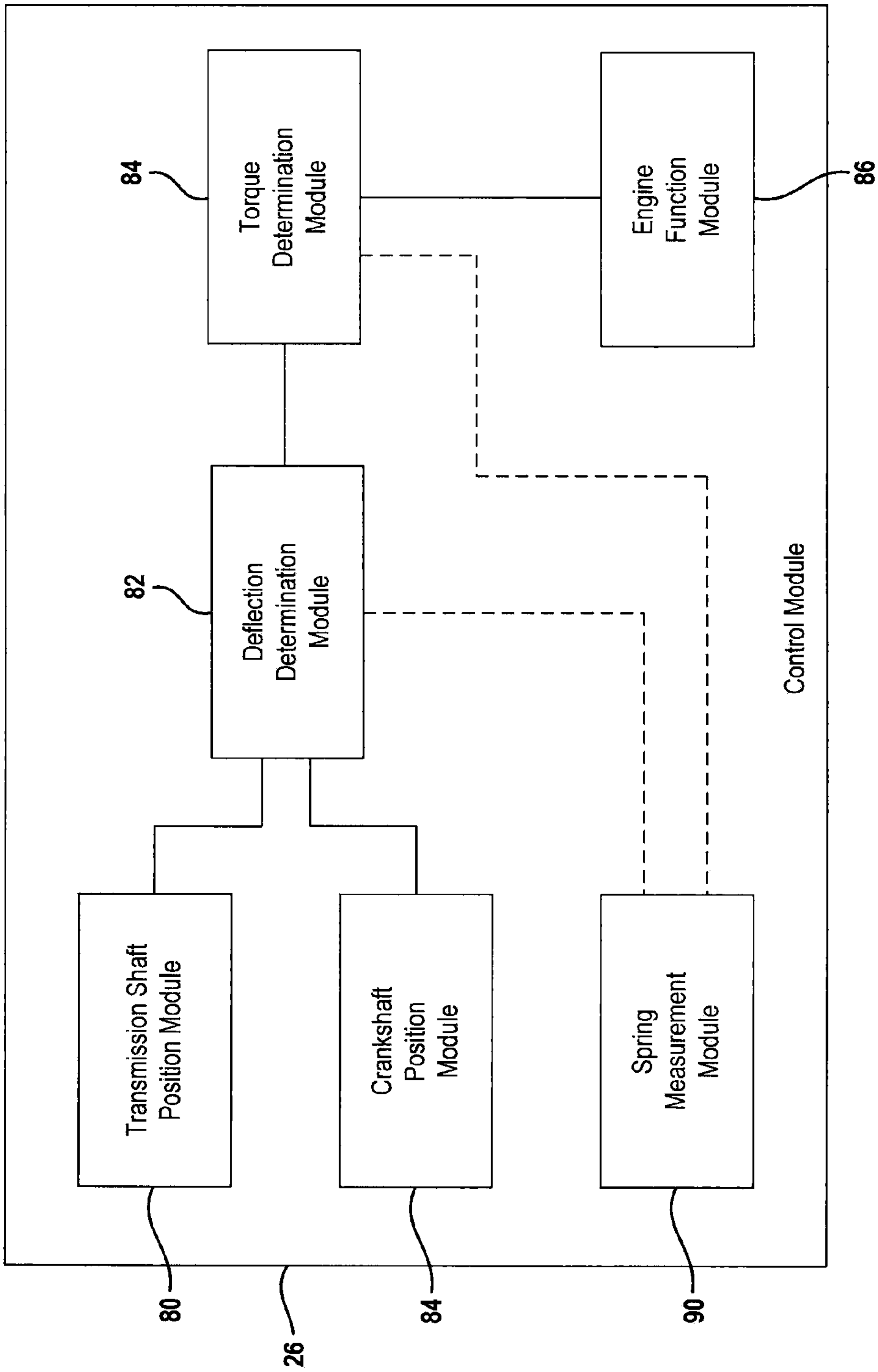
FIG. 4 is a block diagrammatic view of a control module formed according to the present disclosure.

Referring now to FIG. 4, the control module 26 is illustrated in further detail. The control module may include a transmission shaft position module 80. The transmission shaft position module 80 may be in communication with the transmission shaft position sensor. The transmission shaft position module 80 may convert a signal into one readable by the control module. The transmission shaft position module 80 communicates the transmission shaft position to the deflection determination module 82.

A crankshaft position module 84 generates a crankshaft position signal corresponding to the crankshaft position measured or determined by the crankshaft position signal. The crankshaft position signal is communicated to the deflection determination module 82.

A deflection determination module 82 may compare the transmission shaft position signal and the crankshaft position signal. In one embodiment, the transmission shaft position signal may be subtracted from the crankshaft position module to determine an amount of torsional deflection of the clutch friction disk. The output of the deflection determination module may be provided to a torque determination module 84. The amount of torque or torsional deflection from the deflection signal provided by the deflection determination module 82 may correspond directly to a torque as determined in the torque determination module 84. The torque determined in the torque determination module 84 corresponds to the engine brake torque or the crankshaft torque. The engine brake torque determined in the torque determination module 84 may be communicated to the engine function module 86 using a torque signal. The engine function module 86 may be one of a variety of different types of engine functions using the engine brake torque.

A spring measurement module 90 may also be included in the control module. The spring measurement module 90 receives a spring deflection or spring force. The spring signal may be communicated to the deflection module 82 where an amount of spring deflection is determined based upon the spring signal. The spring measurement module 90 may also correspond to a spring force. The spring force may be converted to a deflection in the deflection module 82. The spring measurement module 90 may also generate a spring signal that corresponds to a spring force. The spring force may be converted directly to a torque in the torque determination module 84. As mentioned above, the spring measurement module 90 may be used instead of or in addition to the transmission shaft position modules 80 and the crankshaft position module 84.

Figure 5:
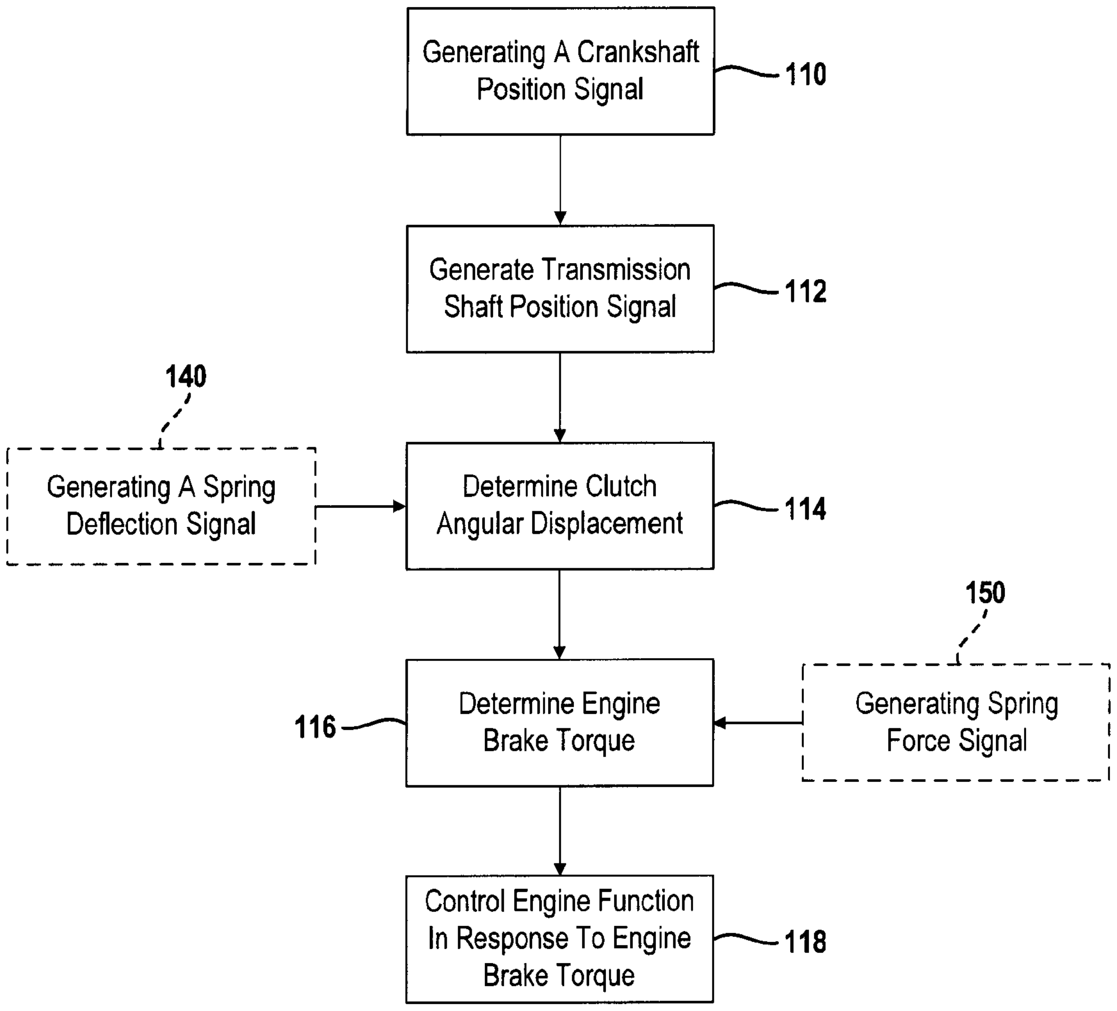
FIG. 5 is a flowchart of a method for controlling engine functions as a function of engine brake torque.

Referring now to FIG. 5, a method for controlling a function of the engine in response to engine brake torque is set forth. In step 110, a crankshaft position signal is generated. The crankshaft position signal may be generated by the crankshaft position sensor 42 illustrated in FIG. 1. In step 112, a transmission shaft position signal 112 may generate a transmission shaft position signal. The transmission shaft position signals may be generated by a transmission shaft signal sensor 60 such that determines the torsional deflection of the clutch disk 48 that is fixedly coupled to the transmission shaft 22. In step 114, a clutch angular displacement 14 is determined by comparing the crankshaft position signal and the transmission shaft position signal. Comparing they take place by subtracting the crankshaft position signal and the transmission shaft signal. In step 116, a brake torque may be determined by the angular clutch displacement from step 114. The amount of clutch angular displacement corresponds directly to the engine brake torque. In step 118, the engine brake torque may be used to control various functions within the engine control module. Likewise, the transmission may also be controlled using the engine brake torque.

Referring back to step 114, the clutch angular displacement may also be determined by a spring deflection signal. A spring deflection signal may be generated in step 140. This is an optional step or a replacement for steps 110 and 112. The spring deflection signal may generate a spring deflection corresponding to the deflection of the clutch disk in response to the torsion of the engine through the crankshaft. The clutch angular displacement may thus be determined in step 114 and the remainder of steps 116 and 118 may be performed.

Referring back to step 116, the engine brake torque is determined. The engine brake torque may be determined directly from a spring force signal. A spring force signal may be generated in step 150. Steps 150, 116 and 118 may thus be used to control an engine function. From the spring force generated in step 150, the engine brake torque may be determined. The brake torques in step 116 may be determined using a look-up table or through a calculated formula.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:

a deflection determination module generating a clutch deflection signal; and an engine function module controlling at least one of an engine function and a transmission function in response to the clutch deflection signal.

2. The control system of claim 1 further comprising a torque determination module generating an engine brake torque signal based on the clutch deflection signal.

3. The control system of claim 1 further comprising:

a transmission shaft determination module generating a transmission shaft position signal; and a crankshaft position module generating a crankshaft position signal, wherein the deflection determination module determines the clutch deflection signal from the transmission shaft determination module and the crankshaft position module.

4. The control system of claim 3 further comprising a hall-effect sensor generating the crankshaft position signal.

5. The control system of claim 3 further comprising a hall-effect sensor generating the transmission shaft position signal.

6. The control system of claim 3 further comprising a hall-effect sensor positioned within a clutch housing generating the transmission shaft position signal.

7. The control system of claim 1 wherein the clutch deflection signal is generated based on a spring deflection signal.

8. The control system of claim 1 further comprising:

a transmission shaft position module generating a transmission position signal;

a crankshaft position module generating a crankshaft position signal; and wherein the deflection determination module determines the clutch deflection signal in response to the transmission position signal and the crankshaft position signal.

9. The control system of claim 1 further comprising:

a clutch spring sensor generating a clutch spring deflection signal; and wherein the deflection determination module determines the clutch deflection signal in response to the clutch spring deflection signal.

10. A method comprising:

generating a clutch deflection signal; and controlling at least one of an engine function and a transmission function in response to the clutch deflection signal.

11. The method of claim 10 further comprising generating an engine brake torque signal based on the clutch deflection signal.

12. The method of claim 10 wherein generating the clutch deflection signal comprises:

generating a crankshaft position signal;

generating a transmission shaft position signal; and comparing the crankshaft position signal and the transmission shaft position signal.

13. The method of claim 12 wherein the crankshaft position signal is generated by a hall-effect sensor.

14. The method of claim 12 wherein the transmission shaft position signal is generated by a hall-effect sensor.

15. The method of claim 12 wherein the transmission shaft position signal is generated by a hall-effect sensor positioned within a clutch housing.

16. The method of claim 1 wherein the clutch deflection signal is generated based on a spring deflection signal.

17. A method comprising:

generating a clutch spring force signal; and controlling at least one of an engine function and a transmission function in response to the clutch spring force signal.

18. The method of claim 17 further comprising generating an engine brake torque based on the clutch spring force signal.

* * * * *